United States Patent
Rangarajan et al.

(10) Patent No.: US 8,170,481 B2
(45) Date of Patent: May 1, 2012

(54) TECHNIQUES FOR DISCOVERING SERVICES PROVIDED IN A WIRELESS NETWORK

(75) Inventors: Anand Rangarajan, Beaverton, OR (US); Victor Lortz, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 825 days.

(21) Appl. No.: 12/053,662

(22) Filed: Mar. 24, 2008

(65) Prior Publication Data

US 2009/0239469 A1    Sep. 24, 2009

(51) Int. Cl.
| | |
|---|---|
| *H04B 7/00* | (2006.01) |
| *H04B 15/00* | (2006.01) |
| *H04W 4/00* | (2009.01) |
| *H04J 3/24* | (2006.01) |
| *H04J 3/16* | (2006.01) |
| *H04J 3/22* | (2006.01) |

(52) U.S. Cl. ............... 455/41.2; 455/502; 455/435.1; 370/349; 370/471

(58) Field of Classification Search ............ 455/41.2, 455/41.3, 502, 68, 574, 434, 435.1; 370/310.2, 370/328, 338, 349, 449, 471
See application file for complete search history.

(56) References Cited

U.S. PATENT DOCUMENTS

| | | | |
|---|---|---|---|
| 6,532,368 B1 | 3/2003 | Hild et al. | |
| 7,085,814 B1 * | 8/2006 | Gandhi et al. | 709/208 |
| 7,522,634 B2 * | 4/2009 | Casey et al. | 370/468 |
| 7,903,574 B2 * | 3/2011 | Vare et al. | 370/252 |
| 2002/0068604 A1 * | 6/2002 | Prabhakar et al. | 455/556 |
| 2002/0159463 A1 | 10/2002 | Wang | |
| 2006/0234631 A1 * | 10/2006 | Dieguez | 455/41.2 |
| 2007/0141984 A1 | 6/2007 | Kuehnel et al. | |
| 2007/0141986 A1 | 6/2007 | Kuehnel et al. | |
| 2007/0141988 A1 | 6/2007 | Kuehnel et al. | |
| 2007/0243888 A1 * | 10/2007 | Faccin | 455/461 |
| 2009/0046657 A1 * | 2/2009 | Kim et al. | 370/331 |
| 2009/0235277 A1 * | 9/2009 | Liu | 719/313 |
| 2010/0254286 A1 | 10/2010 | Rangarajan | |
| 2011/0114716 A1 * | 5/2011 | Pratt | 235/375 |
| 2011/0149806 A1 * | 6/2011 | Verma et al. | 370/255 |

FOREIGN PATENT DOCUMENTS

| | | |
|---|---|---|
| WO | 2009/120576 A2 | 10/2009 |
| WO | 2009/120576 A3 | 11/2009 |

OTHER PUBLICATIONS

International Preliminary Report on Patentability received for PCT Patent Application No. PCT/US2009/037675, mailed on Oct. 7, 2010, 5 pages.
International Search Report/ Written Opinion received for PCT Patent Application No. PCT/US2009/037675, mailed on Oct. 6, 2009, pp. 11.
"U.S. Appl. No. 12/797,173, Non Final Office Action mailed Feb. 22, 2011", 8 pgs.

(Continued)

*Primary Examiner* — Andrew Wendell

(74) *Attorney, Agent, or Firm* — Schwegman, Lundberg & Woessner, P.A.; Gregory J. Gorrie

(57) ABSTRACT

An embodiment of the present invention provides a method for discovering services provided in a wireless network, comprising enabling devices equipped with radio interfaces to advertise the services it provides and discover services offered by other nearby devices without establishing a network connection with the devices.

18 Claims, 1 Drawing Sheet

OTHER PUBLICATIONS

"U.S. Appl. No. 12/797,173, Final Office Action mailed Sep. 20, 2011", 10 pgs.

"U.S. Appl. No. 12/797,173, Response filed Jul. 20, 2011 to Non Final Office Action mailed Feb. 22, 2011", 11 pgs.

"International Application Serial No. PCT/US2009/037675, International Search Report mailed Oct. 6, 2009", 4 pgs.

"Korean Application Serial No. 10-2010-7021216, Office Action mailed Oct. 31, 2011", 3 pgs.

* cited by examiner

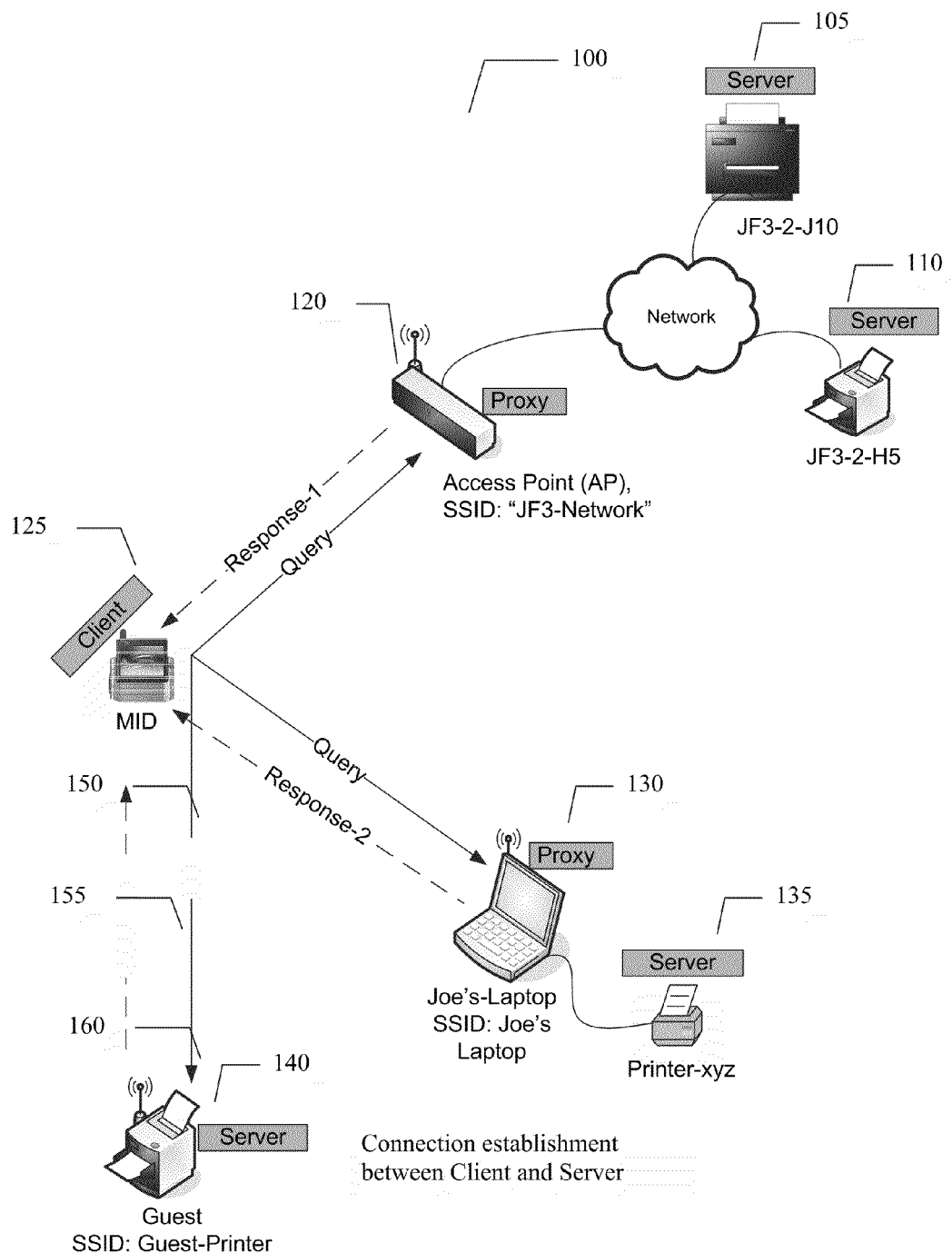

TECHNIQUES FOR DISCOVERING SERVICES PROVIDED IN A WIRELESS NETWORK

BACKGROUND

Today, network devices that provide services (henceforth called "servers"), such as printing, projecting, display, and file sharing services, need to remain online to respond to requests from client devices ("clients") that need the services. However, power conservation is also of foremost importance. Furthermore, many devices today are becoming mobile, with wireless network interfaces and limited battery power. These devices need to be able to efficiently search for or advertise their own services without quickly depleting their power supplies. Service advertisement and discovery over a network is typically done using a protocol operating at Layer-3 or a higher layer in the networking stack. Such protocols require the client device that wishes to discover and utilize a service first establish a connection with the network before discovering available services. With wireless networking, if the client is in an environment where there are multiple networks, the client may be forced to connect and then disconnect from multiple networks before identifying the network that provides the required service. This approach is inefficient in terms of time and power consumption.

Thus, a strong need exists for improved techniques for discovering services provided in a wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 illustrates an example where a user with a Mobile Internet Device (MID) is looking for a printer to print a document from his MID in an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device or a handheld PDA device.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Service advertisement and discovery over a network is typically done using a protocol operating at Layer-3 or a higher layer in the networking stack. Examples of such protocols are UPnP/SSDP [3] and ZeroConf/DNS-SD [2]. Such protocols require the client device that wishes to discover and utilize a service first establish a connection with the network before discovering available services. As used in embodiments of the present invention "establish a connection with the network" may mean initializing Layer-3 and possibly higher layers of the 7-layer network model. If the client is in an environment where there are multiple networks, the client may be forced to connect and then disconnect from multiple networks before identifying the network that provides the required service. This approach is inefficient in terms of time and power consumption. An embodiment of the present invention provides devices equipped with radio interfaces such as, but not limited to, Wi-Fi, UWB, and Bluetooth to advertise the services it provides and also discover services offered by other nearby devices without the need for establishing a network connection with them.

A device that offers one or more services is called a server. A device that utilizes services offered by servers is called a client. An embodiment of the present invention provides two types of messages to be exchanged between the server and the client before they are connected: 1) Query and 2) Response—although the present invention is not limited in this respect.

Query: A Query message is sent by the client that wishes to learn about services provided by devices nearby. The message may be directed to a particular device or broadcast to all devices.

Response: A Response message is sent by a server to advertise the services that it provides. The message may be directed (unicast) to a particular client in response to its Query message or it may be broadcast. The Response message may contain "hints" about available service instances which would help the client decide whether it is interested in that service.

In some scenarios, certain devices may send Response messages on behalf of the server. Such a device is called a Proxy. For example, an AP that provides wireless connectivity to a wired network may act on behalf of servers in the wired network. FIG. 1 shows generally at 100, an example network with client 125, server 105, 110, and proxy 120, 130 devices. In this example network, the Guest printer 140 responds to Query messages by itself whereas the AP 120 and Joe's Computer 130 act as proxies for printers 105, 110 and Printer-xyz 135 respectively.

Information that is exchanged in the Query and Response messages may be derived from service information provided by higher layer service discovery protocols (such as, but not limited to, ZeroConf or UPnP). The fields in the messages may be defined in such a way that both the client and server can specify attributes corresponding to a higher layer discovery protocol. This approach facilitates integration and coordination of functionality between the different service discovery layers. Since L2SD Query and Response messages need to be sent before the client connects to the server's network, only certain types of frames (typically, although not necessarily, management frames) can be used to carry them. In an 802.11 network, one possibility is that the Query message may be sent in a Probe Request and the Response message may be sent in the Probe Response using Information Elements (IEs). In addition, servers may send the Response message periodically in their Beacons. In this case, the clients can passively listen to the beacons and gather information about services available. Similar mechanisms may be used for other types of radio networks such as UWB and Bluetooth. Once the user selects a particular network and one or more service instances to be connected to, the client networking stack may be triggered to connect to that particular network. Once a successful network connection is established, higher-layer discovery mechanisms are triggered with appropriate service instance information already specified by the user to be connected to. By coordinating information exchange by the different service discovery layers, implementation is simplified and user experience can be improved (for example, the user does not need to be prompted more than once to select the service or device they want to connect to).

Continuing with FIG. 1, consider an example where a user with a Mobile Internet Device (MID) 125 is looking for a Printer to print a document from his MID 125. Let us consider that the MID 125 is using ZeroConf as the higher-layer service discovery mechanism and that all the devices are equipped with 802.11 radio interfaces. As shown in FIG. 1, the Query message may be sent from the MID 125 in a Probe Request and the Response message may be sent in the Probe Response using ILEs—although the present invention is not limited in this respect. The MID 125 sends a Query message in its Probe Request indicating the protocol it supports and service type it is interested in. In this example, the protocol is ZeroConf and the service type is "_ipp._tcp" which is the ZeroConf service type that stands for "Internet Protocol Printer". In other words, the MID 125 is interested in any Printer device (service) 105, 110, 135 or 140 that supports the IPP protocol. Servers (or their proxies) that provide compatible service respond with a Response message. The Response message provides enough "hints" about the service instance to help the MID 125 user decide which printer to choose. In this example, and not limited in this respect, the format of the Query message is: <Higher-layer discovery protocol, service type list . . . >. The format of the Response message is: <Higher-layer discovery protocol, Network Identifier, <Service Type, <Service Instance Name, Any additional attributes such as IP address>>>. The present invention does not specify any particular format or layout for the Query and Response messages and the above are merely examples. The messages may be defined in any format which achieves the objective of discovering services using Layer2 frames before connecting to a network. The steps involved in discovering the printers are listed below.

1. MID sends broadcast Query message: <ZeroConf, _ipp._tcp>. The message is received by all the servers in the neighborhood.

2. All servers that provide printing service and support the ZeroConf protocol respond to the Query with a Response message.

a. Response-1 from AP: <ZeroConf, JF3-Network, <_ipp._tcp, <<JF3-2-H5, JF3-2-J10>>> b. Response-2 from Joe's-Laptop: <ZeroConf, Joe's-Laptop, <_ipp._tcp, <Printer-xyz, Location: JF3-2-K9, IP address: 139.145.23.90>>> c. Response-3 from Guest Printer: <ZeroConf, GuestPrinter, <_ipp._tcp, <Guest, Location: JF3-2-C4, IP address: 139.145.23.85>>>

3. MID displays the responses to the user in a user-friendly format and the user chooses the network and printer instance to connect to.

4. MID connects to the chosen network and uses a higher-layer discovery mechanism (ZeroConf in this case) to obtain additional information about the chosen printer so that it can successfully connect with and use the printer.

With today's radio interfaces such as 802.11, one can only discover "networks" but not services offered by other devices connected to those networks. Only after the user connects to a network, the services offered by that network can be discovered using higher-layer service discovery protocols such as ZeroConf and UPnP. If there are multiple networks nearby and the user is unaware of which network provides the services that he is looking for, then he is forced to connect to each network and then invoke the higher-layer service discovery protocol to determine the available services. This is inefficient in terms of time and energy consumed. Embodiments of the present invention, provide a way where a client device can determine information about the devices and services offered by a network and also query for specific services prior to connecting to the network. A further advantage of the invention is that higher-layer server addressing information such as an IP address can be discovered by the client prior to connection. This permits the higher-layer discovery operation performed after connection to be more efficient and more reliable since a unicast higher-layer discovery message can be sent rather than an unreliable broadcast or multicast message. Higher-layer service discovery frameworks such as UPnP and Zeroconf depend upon multicast messages for device and service discovery on unmanaged networks. However, on wireless networks, it is particularly important not to rely on successful delivery of multicast or broadcast messages due to problems of radio interference, obstructions, and signal fading.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. A method performed by a mobile internet device comprising a Wi-Fi radio interface configured for peer-to-peer (P2P) communications, the method comprising:

broadcasting a service discovery query frame as part of a probe request for receipt by nearby P2P server devices or proxies of nearby P2P server devices, the service discovery query frame including a service protocol type field indicating a service protocol type supported by the mobile internet device, a query data field including a service information type pertaining to a requested service that corresponds to the requested service protocol type, and a service transaction identifier (ID); and receiving a service discovery response frame from either a nearby P2P server device or a proxy of a nearby P2P server device that is capable of providing a compatible service in accordance with the supported service protocol type, the service discovery response frame including a service protocol type field to indicate the supported service protocol type, a response data field that includes service information type and service data pertaining to the service protocol type, and the service transaction ID corresponding from the service discovery query frame.

2. The method of claim 1 wherein the service discovery query frame and the service discovery response frame include a service update indicator configured to be incremented when a change in service information is updated for the P2P server device that has sent the service discovery response frame.

3. The method of claim 2 wherein the service discovery query frame and the service discovery response frame comprise layer-2 frames.

4. The method of claim 3 wherein the service discovery query frame comprises a service request type-length-value (TLV) that includes the service protocol type field, the query data field, and the service transaction ID, and wherein the service discovery response frame comprises a service response TLV that includes the service protocol type field, the response data field, and the service transaction ID corresponding to the service request TLV.

5. The method of claim 4 wherein the service response TLV is returned with the service protocol type field set to a predetermined value to indicate that the requested service is not available.

6. The method of claim 3 wherein the service protocol type supported by the mobile internet device is one of a ZeroConf or UPnp service discovery protocol, and wherein when the mobile internet device is requesting printer service and the supported service protocol type is a ZeroConf protocol, the service type is "_ipp._tcp" to indicate that a responding device is an internet protocol printer or a proxy for an internet protocol printer.

7. The method of claim 1 wherein the service discovery query frame and the service discovery response frame are configured in accordance with a Wi-Fi configuration, and wherein the fields of the service discovery query frame and the service discovery response frame specify attributes corresponding to a higher layer service discovery protocol, which facilitates integration and coordination of functionality between different service discovery layers.

8. The method of claim 7 wherein the service discovery query frame and the service discovery response frame are exchanged before a direct P2P connection between the mobile internet device and a nearby P2P server device or a proxy of a nearby P2P server device is established.

9. The method of claim 1 wherein the mobile internet device is configured to passively listen to service discovery query frames and service discovery response frames exchanged between other devices to gather information about services available from other nearby P2P server devices or proxies of other nearby P2P server devices.

10. A mobile internet device comprising a Wi-Fi radio interface configured for peer-to-peer (P2P) communications, the Wi-Fi radio interface configured:

broadcast a service discovery query frame as part of a probe request for receipt by nearby P2P server devices or proxies of nearby P2P server devices, the service discovery query frame including a service protocol type field indicating a service protocol type supported by the mobile internet device, a query data field including a service information type pertaining to a requested service that corresponds to the requested service protocol type, and a service transaction identifier (ID); and receive a service discovery response frame from either a nearby P2P server device or a proxy of a nearby P2P server device that is capable of providing a compatible service in accordance with the supported service protocol type, the service discovery response frame including a service protocol type field to indicate the supported service protocol type, a response data field that includes service information type and service data pertaining to the service protocol type, and the service transaction ID corresponding from the service discovery query frame.

11. The mobile internet device of claim 10 wherein the service discovery query frame and the service discovery response frame include a service update indicator configured to be incremented when a change in service information is updated for the P2P server device that has sent the service discovery response frame.

12. The mobile internet device of claim 11 wherein the service discovery query frame and the service discovery response frame comprise layer-2 frames.

13. The mobile internet device of claim 12 wherein the service discovery query frame comprises a service request type-length-value (TLV) that includes the service protocol type field, the query data field, and the service transaction ID, and wherein the service discovery response frame comprises a service response TLV that includes the service protocol type field, the response data field, and the service transaction ID corresponding to the service request TLV.

14. The mobile internet device of claim 13 wherein the service response TLV is returned with the service protocol type field set to a predetermined value to indicate that the requested service is not available.

15. The mobile internet device of claim 12 wherein the service protocol type supported by the mobile internet device is one of a ZeroConf or UPnp service discovery protocol, and wherein when the mobile internet device is requesting printer service and the supported service protocol type is a ZeroConf protocol, the service type is "_ipp._tcp" to indicate that a responding device is an internet protocol printer or a proxy for an internet protocol printer.

16. The mobile internet device of claim 10 wherein the service discovery query frame and the service discovery response frame are configured in accordance with a Wi-Fi configuration, and wherein the fields of the service discovery query frame and the service discovery response frame specify attributes corresponding to a higher layer service discovery protocol, which facilitates integration and coordination of functionality between different service discovery layers.

17. The mobile internet device of claim 16 wherein the service discovery query frame and the service discovery response frame are exchanged before a direct P2P connection between the mobile internet device and a nearby P2P server device or a proxy of a nearby P2P server device is established.

18. The mobile internet device of claim 10 wherein the mobile internet device is configured to passively listen to service discovery query frames and service discovery response frames exchanged between other devices to gather information about services available from other nearby P2P server devices or proxies of other nearby P2P server devices.

* * * * *